No. 849,185.
PATENTED APR. 2, 1907.
C. H. BALDWIN.
STROKE VARYING MECHANISM.
APPLICATION FILED NOV. 12, 1906.
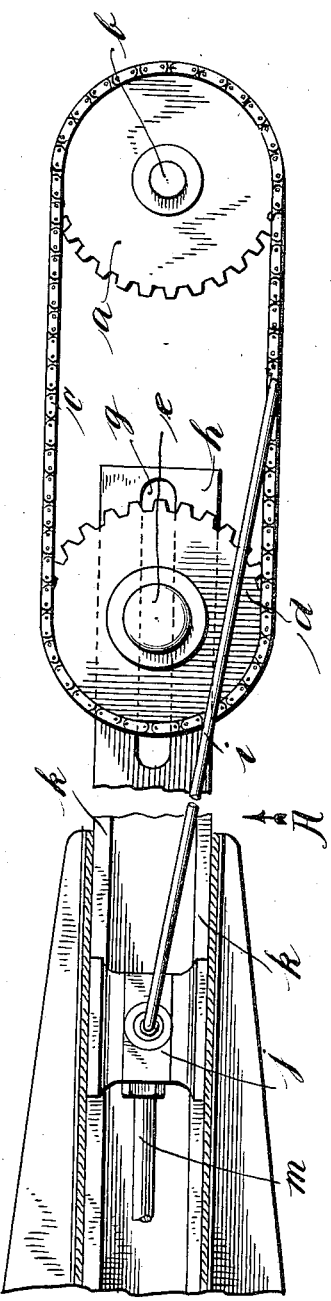
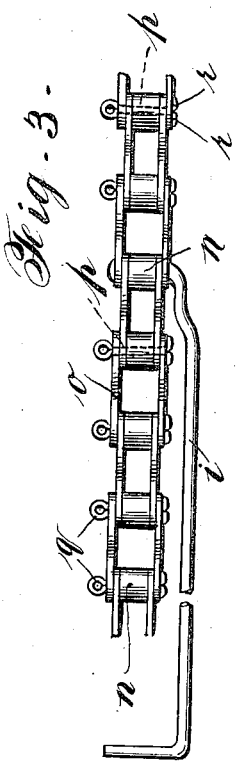
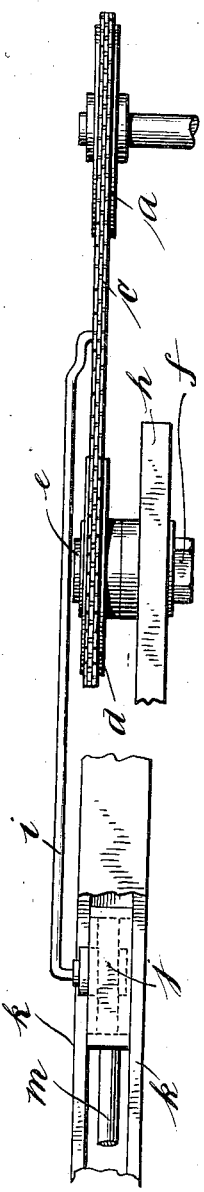
WITNESSES
INVENTOR
BY
ATTORNEY.

ns, a citizen of the United States, residing at Erie,

UNITED STATES PATENT OFFICE.

CLOISE H. BALDWIN, OF ERIE, KANSAS, ASSIGNOR OF ONE-THIRD TO W. R. CLINE AND ONE-THIRD TO THOMAS K. REECE, OF ERIE, KANSAS.

STROKE-VARYING MECHANISM.

No. 849,185.   Specification of Letters Patent.   Patented April 2, 1907.

Application filed November 12, 1906. Serial No. 343,056.

*To all whom it may concern:*

Be it known that I, CLOISE H. BALDWIN, a citizen of the United States, residing at Erie, in the county of Neosho and State of Kansas, have invented certain new and useful Improvements in Stroke-Varying Mechanism, of which the following is a specification, reference being had to the accompanying drawings.

My invention relates to improvements in means for transmitting power; and the object of my invention is to provide a device of this character which may be readily and quickly adjusted to vary the length of the stroke, the connecting-rod being of a constant length.

In the drawings illustrating the principle of my invention and the best mode now known to me of applying that principle, Figure 1 is a side view of so much of a power-transmitting mechanism as is necessary to illustrate my invention. Fig. 2 is another view of the same taken in the direction of the arrow A in Fig. 1, and Fig. 3 is a detail of the driving-chain.

The sprocket-wheel $a$ is mounted fast upon the shaft $b$ and is connected by the sprocket-chain $c$ with the sprocket-wheel $d$, mounted free to rotate on the stub-shaft $e$, one end of which is threaded to receive the nut $f$ and which is mounted in the slot $g$ formed in the supporting-beam $h$. One end of the connecting-rod $i$ is attached to the cross-head $j$, which is slidably mounted in the guides $k$ and which carries the rod $m$. The other end of the connecting-rod is connected to the sprocket-chain $c$, this end being bent and passed through holes in the washer $n$ and the links $o$.

The cross-head $j$, the slotted support $h$, and the shafts $b$ and $e$ are in substantial alinement with one another.

The links of the chain are connected or keyed together by a key-pin $p$, which is doubled upon itself and formed with an eye $q$ near its middle. The ends $r$ of the key-pin are upset, as is shown in Fig. 3.

If it be found desirable to vary the stroke or length of travel of the cross-head $j$, the nut $f$ is loosened and the stub-shaft $e$ is moved to the desired position in the slot $g$, the sprocket-chain $c$ having been disengaged from the sprocket-wheel $d$ in case the stroke is lengthened. In the latter case new links are added to the chain until it is of the length needed for the new position of the stub-shaft. The ends of the chain are connected after passing it around the sprockets $a$ and $c$. In case the stroke is to be shortened links are removed from the chain until it is of the desired length.

I claim—

A stroke-varying mechanism comprising the combination of a shaft; a sprocket-wheel fast upon said shaft; a stub-shaft; a support therefor formed with a slot in which said stub-shaft is adjustably mounted; a sprocket-wheel loose upon said stub-shaft; a chain connecting said sprocket-wheels, the links of said chain being readily removable to shorten said chain, when said stub-shaft is moved toward the first-named shaft; a cross-head; a support therefor; and a connecting-rod, one end of which is attached to said cross-head and the other end of which is secured to one of the links of said chain; said cross-head, said slotted support and said shafts being in substantial alinement with one another.

CLOISE H. BALDWIN.

Witnesses:
  GRANT CUMMINGS,
  J. Q. STRATTON.